(12) United States Patent
Abts et al.

(10) Patent No.: US 10,070,597 B2
(45) Date of Patent: Sep. 11, 2018

(54) METHOD TO CYCLE THE DRIVE MOTORS OF AN IRRIGATION SYSTEM

(71) Applicant: Precision Circle, LLC, Denver, CO (US)

(72) Inventors: Gerald L. Abts, Denver, CO (US); Kevin J. Abts, Aurora, CO (US)

(73) Assignee: Precision Circle, LLC, Denver, CO (US)

( * ) Notice: Subject to any disclaimer, the term of this patent is extended or adjusted under 35 U.S.C. 154(b) by 353 days.

(21) Appl. No.: 14/918,288

(22) Filed: Oct. 20, 2015

(65) Prior Publication Data

US 2017/0105370 A1    Apr. 20, 2017

(51) Int. Cl.
| | | |
|---|---|---|
| G05D 11/00 | (2006.01) | |
| A01G 25/16 | (2006.01) | |
| A01G 25/09 | (2006.01) | |
| G05B 15/02 | (2006.01) | |

(52) U.S. Cl.
CPC ......... *A01G 25/165* (2013.01); *A01G 25/092* (2013.01); *G05B 15/02* (2013.01)

(58) Field of Classification Search
CPC ............................ A01G 25/165; A01G 25/092
USPC ........................................ 700/284, 296, 243
See application file for complete search history.

(56) References Cited

U.S. PATENT DOCUMENTS

| | | | | |
|---|---|---|---|---|
| 3,680,778 A | * | 8/1972 | Sisson .................. | A01G 25/092 239/100 |
| 4,580,731 A | | 4/1986 | Kegel et al. | |
| 4,585,027 A | * | 4/1986 | Stillions ............... | A01G 25/165 137/624.11 |
| 4,763,836 A | * | 8/1988 | Lyle ....................... | A01G 25/09 239/243 |
| 5,246,164 A | * | 9/1993 | McCann .............. | A01B 79/005 239/11 |
| 5,255,857 A | | 10/1993 | Hunt | |
| 5,272,975 A | * | 12/1993 | Dettinger ............... | B41F 13/40 101/218 |
| 5,623,379 A | * | 4/1997 | Nishimura ............. | G11B 19/20 318/400.17 |
| 5,752,768 A | * | 5/1998 | Assh ...................... | B28C 5/422 366/3 |
| 5,927,603 A | * | 7/1999 | McNabb .............. | A01G 25/167 239/63 |
| 6,007,004 A | | 12/1999 | Unruh | |
| 6,036,121 A | * | 3/2000 | Gerdes ................. | A01G 25/162 239/1 |
| 6,337,971 B1 | | 1/2002 | Abts | |
| 6,666,384 B2 | * | 12/2003 | Prandi .................. | A01G 25/092 239/1 |
| 6,755,362 B2 | | 6/2004 | Krieger et al. | |

(Continued)

*Primary Examiner* — Viet Q Nguyen
(74) *Attorney, Agent, or Firm* — Dorr, Carson & Birney PC

(57) ABSTRACT

A system for controlling the operation of a moving irrigation system lengthens the period of the on-and-off cycle specified by the speed timer to drive the pivot arm assembly. This reduces the frequency of the on-and-off cycles and thereby reduces wear and tear on the drive components. To modify the cycle period, a processor determines a modified on-time and a modified off-time having the same ratio of on-time to off-time as the speed timer to maintain the same average speed for the pivot arm assembly. The processor then controls operation of the pivot arm assembly to move in an on-and-off manner using the modified on-time and modified off-time.

13 Claims, 13 Drawing Sheets

(56) References Cited

U.S. PATENT DOCUMENTS

| | | |
|---|---|---|
| 6,820,828 B1 | 11/2004 | Greenwalt |
| 7,384,008 B1 | 6/2008 | Malsam |
| 7,584,053 B2 * | 9/2009 | Abts .................... A01G 25/092 239/727 |
| 8,849,468 B2 | 9/2014 | Abts et al. |
| 9,459,628 B1 * | 10/2016 | Abts .................... A01G 25/092 |
| 9,643,196 B2 * | 5/2017 | Klinefelter ................ B05B 3/02 |
| 2002/0008167 A1 | 1/2002 | Haberland et al. |
| 2003/0066912 A1 | 4/2003 | Krieger et al. |
| 2004/0093912 A1 | 5/2004 | Krieger et al. |
| 2006/0027677 A1 * | 2/2006 | Abts .................... A01G 25/092 239/67 |
| 2006/0283507 A1 * | 12/2006 | Marcy .................. A01G 25/097 137/580 |
| 2007/0267524 A1 | 11/2007 | Mack |
| 2010/0032493 A1 * | 2/2010 | Abts .................... A01G 25/092 239/11 |
| 2012/0053776 A1 | 3/2012 | Malsam et al. |
| 2012/0084115 A1 * | 4/2012 | Cline ..................... A01G 25/16 705/7.27 |
| 2013/0018553 A1 | 1/2013 | Malsam |
| 2013/0116836 A1 * | 5/2013 | Abts .................... A01G 25/092 700/284 |
| 2013/0211717 A1 * | 8/2013 | Abts .................... A01G 25/16 701/485 |
| 2013/0253752 A1 | 9/2013 | Grabow |
| 2014/0225747 A1 | 8/2014 | Abts |
| 2014/0312134 A1 * | 10/2014 | DeFrank ................ A01G 25/02 239/1 |
| 2015/0129680 A1 * | 5/2015 | Abts .................... A01G 25/092 239/73 |
| 2015/0164007 A1 * | 6/2015 | Schiltz ................ A01G 25/092 700/284 |
| 2016/0366840 A1 * | 12/2016 | Betzen ................ A01G 25/092 |
| 2017/0055469 A1 * | 3/2017 | Abts ..................... G05B 15/02 |

\* cited by examiner

| Prior Art One-minute Percent Timer | | | | | | Fixed Cycle On-Time with Varied Off-Time | | | | | |
|---|---|---|---|---|---|---|---|---|---|---|---|
| % Rate Speed | Max Rate of 10 (ft/min) | Cycle On-Time (sec) 61 | Cycle Off-Time (sec) 62 | Total Cycle Time (min) 63 | Total On/Off Cycles Per Rotation (8,168 feet) | Max Rate of 10 (ft/min) | Cycle On-Time (sec) 64 | Cycle Off-Time (sec) 65 | Total Cycle Time (min) 66 | Total On/Off Cycles Per Rotation (8,168 ft) | % Reduction in On/Off Cycles |
| 1 | 2 | 3 | 4 | 5 | 6 | 7 | 8 | 9 | 10 | 11 | 12 |
| 5% | 0.50 | 3.00 | 57.00 | 1.00 | 16,336 | 5.00 | 30.00 | 570.00 | 10.00 | 1,634 | 90.0% |
| 6% | 0.60 | 3.60 | 56.40 | 1.00 | 13,613 | 5.00 | 30.00 | 470.00 | 8.33 | 1,634 | 88.0% |
| 7% | 0.70 | 4.20 | 55.80 | 1.00 | 11,669 | 5.00 | 30.00 | 398.57 | 7.14 | 1,634 | 86.0% |
| 8% | 0.80 | 4.80 | 55.20 | 1.00 | 10,210 | 5.00 | 30.00 | 345.00 | 6.25 | 1,634 | 84.0% |
| 9% | 0.90 | 5.40 | 54.60 | 1.00 | 9,076 | 5.00 | 30.00 | 303.33 | 5.56 | 1,634 | 82.0% |
| 10% | 1.00 | 6.00 | 54.00 | 1.00 | 8,168 | 5.00 | 30.00 | 270.00 | 5.00 | 1,634 | 80.0% |
| 11% | 1.10 | 6.60 | 53.40 | 1.00 | 7,425 | 5.00 | 30.00 | 242.73 | 4.55 | 1,634 | 78.0% |
| 12% | 1.20 | 7.20 | 52.80 | 1.00 | 6,807 | 5.00 | 30.00 | 220.00 | 4.17 | 1,634 | 76.0% |
| 13% | 1.30 | 7.80 | 52.20 | 1.00 | 6,283 | 5.00 | 30.00 | 200.77 | 3.85 | 1,634 | 74.0% |
| 14% | 1.40 | 8.40 | 51.60 | 1.00 | 5,834 | 5.00 | 30.00 | 184.29 | 3.57 | 1,634 | 72.0% |
| 15% | 1.50 | 9.00 | 51.00 | 1.00 | 5,445 | 5.00 | 30.00 | 170.00 | 3.33 | 1,634 | 70.0% |
| 16% | 1.60 | 9.60 | 50.40 | 1.00 | 4,105 | 5.00 | 30.00 | 157.50 | 3.13 | 1,634 | 68.0% |
| 17% | 1.70 | 10.20 | 49.80 | 1.00 | 4,805 | 5.00 | 30.00 | 146.47 | 2.94 | 1,634 | 66.0% |
| 18% | 1.80 | 10.80 | 49.20 | 1.00 | 4,538 | 5.00 | 30.00 | 136.67 | 2.78 | 1,634 | 64.0% |
| 19% | 1.90 | 11.40 | 48.60 | 1.00 | 4,299 | 5.00 | 30.00 | 127.89 | 2.63 | 1,634 | 62.0% |
| 20% | 2.00 | 12.00 | 48.00 | 1.00 | 4,084 | 5.00 | 30.00 | 120.00 | 2.50 | 1,634 | 60.0% |
| 21% | 2.10 | 12.60 | 47.40 | 1.00 | 3,890 | 5.00 | 30.00 | 112.86 | 2.38 | 1,634 | 58.0% |
| 22% | 2.20 | 13.20 | 46.80 | 1.00 | 3,713 | 5.00 | 30.00 | 106.36 | 2.27 | 1,634 | 56.0% |
| 23% | 2.30 | 13.80 | 46.20 | 1.00 | 3,551 | 5.00 | 30.00 | 100.43 | 2.17 | 1,634 | 54.0% |
| 24% | 2.40 | 14.40 | 45.60 | 1.00 | 3,403 | 5.00 | 30.00 | 95.00 | 2.08 | 1,634 | 52.0% |
| 25% | 2.50 | 15.00 | 45.00 | 1.00 | 3,267 | 5.00 | 30.00 | 90.00 | 2.00 | 1,634 | 50.0% |
| 26% | 2.60 | 15.60 | 44.40 | 1.00 | 3,142 | 5.00 | 30.00 | 85.38 | 1.92 | 1,634 | 48.0% |
| 27% | 2.70 | 16.20 | 43.80 | 1.00 | 3,025 | 5.00 | 30.00 | 81.11 | 1.85 | 1,634 | 46.0% |

From Fig. 7

| | Prior Art One-minute Percent Timer | | | | | | Fixed Cycle On-Time with Varied Off-Time | | | | | |
|---|---|---|---|---|---|---|---|---|---|---|---|---|
| % Rate Speed | Max Rate of 10 (ft/min) | Cycle On-Time (sec) 61 | Cycle Off-Time (sec) 62 | Total Cycle Time (min) 63 | Total On/Off Cycles Per Rotation (8,168 feet) | | Max Rate of 10 (ft/min) | Cycle On-Time (sec) 64 | Cycle Off-Time (sec) 65 | Total Cycle Time (min) 66 | Total On/Off Cycles Per Rotation (8,168 feet) | % Reduction in On/Off Cycles |
| 1 | 2 | 3 | 4 | 5 | 6 | | 7 | 8 | 9 | 10 | 11 | 12 |
| 28% | 2.80 | 16.80 | 43.20 | 1.00 | 2,917 | | 5.00 | 30.00 | 77.14 | 1.79 | 1,634 | 44.0% |
| 29% | 2.90 | 17.40 | 43.60 | 1.00 | 2,817 | | 5.00 | 30.00 | 73.45 | 1.72 | 1,634 | 42.0% |
| 30% | 3.00 | 18.00 | 42.00 | 1.00 | 2,723 | | 5.00 | 30.00 | 70.00 | 1.67 | 1,634 | 40.0% |
| 31% | 3.10 | 18.60 | 41.40 | 1.00 | 2,635 | | 5.00 | 30.00 | 66.77 | 1.61 | 1,634 | 38.0% |
| 32% | 3.20 | 19.20 | 40.80 | 1.00 | 2,553 | | 5.00 | 30.00 | 63.75 | 1.56 | 1,634 | 36.0% |
| 33% | 3.30 | 19.80 | 40.20 | 1.00 | 2,475 | | 5.00 | 30.00 | 60.91 | 1.52 | 1,634 | 34.0% |
| 34% | 3.40 | 20.40 | 39.60 | 1.00 | 2,402 | | 5.00 | 30.00 | 58.24 | 1.47 | 1,634 | 32.0% |
| 35% | 3.50 | 21.00 | 39.00 | 1.00 | 2,334 | | 5.00 | 30.00 | 55.71 | 1.43 | 1,634 | 30.0% |
| 36% | 3.60 | 21.60 | 38.40 | 1.00 | 2,269 | | 5.00 | 30.00 | 53.33 | 1.39 | 1,634 | 28.0% |
| 37% | 3.70 | 22.20 | 37.80 | 1.00 | 2,208 | | 5.00 | 30.00 | 51.08 | 1.35 | 1,634 | 26.0% |
| 38% | 3.80 | 22.80 | 37.20 | 1.00 | 2,149 | | 5.00 | 30.00 | 48.95 | 1.32 | 1,634 | 24.0% |
| 39% | 3.90 | 23.40 | 36.60 | 1.00 | 2,094 | | 5.00 | 30.00 | 46.92 | 1.28 | 1,634 | 22.0% |
| 40% | 4.00 | 24.00 | 36.00 | 1.00 | 2,042 | | 5.00 | 30.00 | 45.00 | 1.25 | 1,634 | 20.0% |
| 41% | 4.10 | 24.60 | 35.40 | 1.00 | 1,992 | | 5.00 | 30.00 | 43.17 | 1.22 | 1,634 | 18.0% |
| 42% | 4.20 | 25.20 | 34.80 | 1.00 | 1,945 | | 5.00 | 30.00 | 41.43 | 1.19 | 1,634 | 16.0% |
| 43% | 4.30 | 25.80 | 34.20 | 1.00 | 1,900 | | 5.00 | 30.00 | 39.77 | 1.16 | 1,634 | 14.0% |
| 44% | 4.40 | 26.40 | 33.60 | 1.00 | 1,856 | | 5.00 | 30.00 | 38.77 | 1.14 | 1,634 | 12.0% |
| 45% | 4.50 | 27.00 | 33.00 | 1.00 | 1,815 | | 5.00 | 30.00 | 36.67 | 1.11 | 1,634 | 10.0% |
| 46% | 4.60 | 27.60 | 32.40 | 1.00 | 1,776 | | 5.00 | 30.00 | 35.22 | 1.09 | 1,634 | 8.0% |
| 47% | 4.70 | 28.20 | 31.80 | 1.00 | 1,738 | | 5.00 | 30.00 | 33.83 | 1.06 | 1,634 | 6.0% |
| 48% | 4.80 | 28.80 | 31.20 | 1.00 | 1,702 | | 5.00 | 30.00 | 32.50 | 1.04 | 1,634 | 4.0% |
| 49% | 4.90 | 29.40 | 30.60 | 1.00 | 1,667 | | 5.00 | 30.00 | 31.22 | 1.02 | 1,634 | 2.0% |
| 50%+ | 5.00 | 30.00 | 30.00 | 1.00 | 1,634 | | 5.00 | 30.00 | 30.00 | 1.00 | 1,634 | 0.0% |

| Prior Art One-minute Percent Timer | | | | | | Varied Cycle On-Time With Varied Off-Time | | | | | |
|---|---|---|---|---|---|---|---|---|---|---|---|
| % Rate Speed | Max Rate of 10 (ft/min) | Cycle On Time (sec) 61 | Cycle Off Time (sec) 62 | Total Cycle Time (min) 63 | Total On/Off Cycles Per Rotation (8,168 feet) | Max Rate of 10 (ft/min) | Cycle On Time (sec) 64 | Cycle Off Time (sec) 65 | Total Cycle Time (min) 66 | Total On/Off Cycles Per Rotation (8,168 feet) | % Reduction in On/Off Cycles |
| 1 | 2 | 3 | 4 | 5 | 6 | 7 | 8 | 9 | 10 | 11 | 12 |
| 5% | 0.50 | 3.00 | 57.00 | 1.00 | 16,336 | 2.50 | 15.0 | 285.1 | 5.0 | 3,267 | 80.0% |
| 6% | 0.60 | 3.60 | 56.40 | 1.00 | 13,613 | 2.56 | 15.3 | 240.3 | 4.3 | 3,196 | 76.50 |
| 7% | 0.70 | 4.20 | 55.80 | 1.00 | 11,669 | 2.61 | 15.7 | 208.2 | 3.7 | 3,128 | 73.2% |
| 8% | 0.80 | 4.80 | 55.20 | 1.00 | 10,210 | 2.67 | 16.0 | 184.0 | 3.3 | 3,062 | 70.0% |
| 9% | 0.90 | 5.40 | 54.60 | 1.00 | 9,076 | 2.72 | 16.3 | 165.2 | 3.0 | 3,000 | 66.9% |
| 10% | 1.00 | 6.00 | 54.00 | 1.00 | 8,168 | 2.78 | 16.7 | 150.0 | 2.8 | 2,940 | 64.0% |
| 11% | 1.10 | 6.60 | 53.40 | 1.00 | 7,425 | 2.83 | 17.0 | 137.6 | 2.6 | 2,822 | 61.2% |
| 12% | 1.20 | 7.20 | 52.80 | 1.00 | 6,807 | 2.89 | 17.3 | 127.1 | 2.4 | 2,827 | 58.5% |
| 13% | 1.30 | 7.80 | 52.20 | 1.00 | 6,283 | 2.94 | 17.7 | 118.3 | 2.3 | 2,774 | 55.9% |
| 14% | 1.40 | 8.40 | 51.60 | 1.00 | 5,834 | 3.00 | 18.0 | 110.6 | 2.1 | 2,722 | 53.3% |
| 15% | 1.50 | 9.00 | 51.00 | 1.00 | 5,445 | 3.06 | 18.3 | 103.9 | 2.0 | 2,673 | 50.9% |
| 16% | 1.60 | 9.60 | 50.40 | 1.00 | 5,105 | 3.11 | 18.7 | 98.0 | 1.9 | 2,625 | 48.6% |
| 17% | 1.70 | 10.20 | 49.80 | 1.00 | 4,805 | 3.17 | 19.0 | 92.8 | 1.9 | 2,579 | 46.3% |
| 18% | 1.80 | 10.80 | 49.20 | 1.00 | 4,538 | 3.22 | 19.3 | 88.1 | 1.8 | 2,535 | 44.1% |
| 19% | 1.90 | 11.40 | 48.60 | 1.00 | 4,299 | 3.28 | 19.7 | 83.9 | 1.7 | 2,492 | 42.0% |
| 20% | 2.00 | 12.00 | 48.00 | 1.00 | 4,084 | 3.33 | 20.0 | 80.0 | 1.7 | 2,450 | 40.0% |
| 21% | 2.10 | 12.60 | 47.40 | 1.00 | 3,890 | 3.39 | 20.3 | 76.5 | 1.6 | 2,410 | 38.0% |
| 22% | 2.20 | 13.20 | 46.80 | 1.00 | 3,713 | 3.44 | 20.7 | 73.3 | 1.6 | 2,371 | 36.1% |
| 23% | 2.30 | 13.80 | 46.20 | 1.00 | 3,551 | 3.50 | 21.0 | 70.3 | 1.5 | 2,333 | 34.3% |
| 24% | 2.40 | 14.40 | 45.60 | 1.00 | 3,403 | 3.56 | 21.3 | 67.6 | 1.5 | 2,297 | 32.5% |
| 25% | 2.50 | 15.00 | 45.00 | 1.00 | 3,267 | 3.61 | 21.7 | 65.0 | 1.4 | 2,262 | 30.8% |
| 26% | 2.60 | 15.60 | 44.40 | 1.00 | 3,142 | 3.67 | 22.0 | 62.6 | 1.4 | 2,227 | 29.1% |
| 27% | 2.70 | 16.20 | 43.80 | 1.00 | 3,025 | 3.72 | 22.3 | 60.4 | 1.4 | 2,194 | 27.5% |

*From Fig. 9*

*Fig. 10*

| Prior Art One-minute Percent Timer | | | | | | Varied Cycle On-Time With Varied Off-Time | | | | | |
|---|---|---|---|---|---|---|---|---|---|---|---|
| % Rate Speed 10(ft/min) | Max Rate of 10(ft/min) | Cycle On Time (sec) 61 | Cycle Off Time (sec) 62 | Total Cycle Time (min) 63 | Total On/Off Cycles Per Rotation (8,168 feet) | Max Rate of 10 (ft/min) | Cycle On-Time (sec) 64 | Cycle Off-Time (sec) 65 | Total Cycle Time (min) 66 | Total Start/ Stop Cycles Per Rotation (8,168 feet) | % Reduction in On/Off Cycles |
| 1 | 2 | 3 | 4 | 5 | 6 | 7 | 8 | 9 | 10 | 11 | 12 |
| 28% | 2.80 | 16.80 | 43.20 | 1.00 | 2,917 | 3.78 | 22.7 | 58.3 | 1.3 | 2,162 | 25.9% |
| 29% | 2.90 | 17.40 | 42.60 | 1.00 | 2,817 | 3.83 | 23.0 | 56.3 | 1.3 | 2,131 | 24.4% |
| 30% | 3.00 | 18.00 | 42.00 | 1.00 | 2,723 | 3.89 | 23.3 | 54.4 | 1.3 | 2,100 | 22.9% |
| 31% | 3.10 | 18.60 | 41.40 | 1.00 | 2,635 | 3.94 | 23.7 | 52.7 | 1.3 | 2,071 | 21.4% |
| 32% | 3.20 | 19.20 | 40.80 | 1.00 | 2,553 | 4.00 | 16.3 | 51.0 | 1.3 | 2,042 | 20.0% |
| 33% | 3.30 | 19.80 | 40.20 | 1.00 | 2,475 | 4.06 | 24.3 | 49.4 | 1.2 | 2,014 | 18.6% |
| 34% | 3.40 | 20.40 | 39.60 | 1.00 | 2,402 | 4.11 | 24.7 | 47.9 | 1.2 | 1,987 | 17.3% |
| 35% | 3.50 | 21.00 | 39.00 | 1.00 | 2,334 | 4.17 | 25.0 | 46.4 | 1.2 | 1,960 | 16.0% |
| 36% | 3.60 | 21.60 | 38.40 | 1.00 | 2,269 | 4.22 | 25.3 | 45.0 | 1.2 | 1,934 | 14.7% |
| 37% | 3.70 | 22.20 | 37.80 | 1.00 | 2,208 | 4.28 | 25.7 | 43.7 | 1.2 | 1,909 | 13.5% |
| 38% | 3.80 | 22.80 | 37.20 | 1.00 | 2,149 | 4.33 | 26.0 | 42.4 | 1.2 | 1,885 | 12.3% |
| 39% | 3.90 | 23.40 | 36.60 | 1.00 | 2,094 | 4.39 | 26.3 | 41.2 | 1.1 | 1,861 | 11.1% |
| 40% | 4.00 | 24.00 | 36.00 | 1.00 | 2,042 | 4.44 | 26.7 | 40.0 | 1.1 | 1,838 | 10.0% |
| 41% | 4.10 | 24.60 | 35.40 | 1.00 | 1,992 | 4.50 | 27.0 | 38.9 | 1.1 | 1,815 | 8.9% |
| 42% | 4.20 | 25.20 | 34.80 | 1.00 | 1,945 | 4.56 | 27.3 | 37.7 | 1.1 | 1,793 | 7.8% |
| 43% | 4.30 | 25.80 | 34.20 | 1.00 | 1,900 | 4.61 | 27.7 | 36.7 | 1.1 | 1,771 | 6.8% |
| 44% | 4.40 | 26.40 | 33.60 | 1.00 | 1,856 | 4.67 | 28.0 | 35.6 | 1.1 | 1,750 | 5.7% |
| 45% | 4.50 | 27.00 | 33.00 | 1.00 | 1,815 | 4.72 | 28.3 | 34.6 | 1.0 | 1,730 | 4.7% |
| 46% | 4.60 | 27.60 | 32.40 | 1.00 | 1,776 | 4.78 | 28.7 | 33.7 | 1.0 | 1,709 | 3.7% |
| 47% | 4.70 | 28.20 | 31.80 | 1.00 | 1,738 | 4.83 | 29.0 | 32.7 | 1.0 | 1,690 | 2.8% |
| 48% | 4.80 | 28.80 | 31.20 | 1.00 | 1,702 | 4.89 | 29.3 | 31.8 | 1.0 | 1,671 | 1.8% |
| 49% | 4.90 | 29.40 | 30.60 | 1.00 | 1,667 | 4.94 | 29.7 | 30.9 | 1.0 | 1,652 | 0.9% |
| 50% | 5.00 | 30.0 | 30.00 | 1.00 | 1,634 | 5.00 | 30.0 | 30.0 | 1.0 | 1,634 | 0.0% |

US 10,070,597 B2

METHOD TO CYCLE THE DRIVE MOTORS OF AN IRRIGATION SYSTEM

BACKGROUND OF THE INVENTION

Field of the Invention

The present invention relates generally to the field of control systems for self-propelled mechanized irrigation systems, primarily center pivot irrigation systems. More specifically, the present invention discloses a control method for irrigation systems that substantially reduces the number of on-and-off cycles of the drive motors for a given average speed.

Statement of the Problem

Self-propelled mechanized irrigation systems, such as center pivot irrigation systems, generally include a speed timer device to set the speed of an outermost drive tower by cycling a corresponding span motor on and off. A speed timer is typically a mechanical device that controls an electrical circuit in an on-and-off manner with a predetermined cycle period (e.g., one minute). Or, the pivot speed can be controlled locally or remotely using a solid-state device with a similar on-and-off cycle function controlling an outermost span motor to result in a desired average speed.

Conventionally, the speed is generally kept constant for an irrigation cycle based on the base percent setting of the speed timer. The remaining intermediate drive towers are in turn controlled in an on-and-off manner by an alignment system. The relative movement of an adjacent outer drive tower actuates the alignment system on each intermediate drive tower.

Conventional means of controlling the speed of the moving center pivot arm require on-and-off cycling of the outermost drive motor. The frequency of on-and-off cycles is typically once per minute. However, the frequency may be one per two minutes, one per three minutes, etc. The combination of outermost drive motor on-time and off-time duration is always constrained within a fixed cycle time set of a speed timer. This requires one on-and-off cycle for the outermost drive motor per cycle period at any selected speed.

FIG. 1 illustrates a center pivot irrigation system 1 in accordance with the conventional prior art. The center pivot irrigation system 1 described herein may also be referred to as a self-propelled irrigation system. Other self-propelled irrigation systems may include a linear-move irrigation system, a lateral move irrigation system, or the like. As shown in FIG. 1, the center pivot irrigation system 1 may include a center pivot point structure 2, a moving center pivot arm assembly 10 coupled (e.g., connected) to the center pivot point structure 2. The moving center pivot arm assembly 10 includes spans 12, 13, 14, supported by tower structures 30, 31, 32 with span motors 38, and wheels 36 propelling fixed-speed drive assemblies 34 that include fixed-speed drive controllers 37, and with an end boom 15. The drive controllers 37 may be propelled in either a forward movement direction 54 or a reverse movement direction 55. FIG. 3A is a diagram illustrating the movement of a conventional center pivot arm assembly 1 with a center pivot point structure 2 moving over wheel tracks 50, 51, 52 in a forward direction 54 or a reverse direction 55 over a circular field 6. FIG. 3 is a diagram illustrating the movement of a conventional center pivot arm assembly over ten on-and-off cycles.

FIG. 4A illustrates the components of a fixed-speed drive assembly 34, typical of the outermost drive tower 32 of a conventional center pivot irrigation system 1 (FIG. 1). Referring to FIGS. 1 and 4A, the fixed-speed drive assembly 34 of outermost drive tower 32 may include a fixed-speed drive controller 37, a span motor 38, and wheels 36. The fixed-speed drive controller 37 of the outermost drive tower 32, typically used in the prior art, may include an electromechanical contactor or motor starter (not shown) that may be controlled by a speed timer 4, that may be located at pivot point 2, using a speed timer 4 base percent setting 3, 5 (FIGS. 2A and 2B) to cycle the span motor 38 of the outermost drive tower 32 on-and-off. Such repeated on-and-off control cycling of the span motor 38 of the outermost fixed-speed drive assembly 34 of outermost drive tower 32 provides the variable speed for the moving center pivot arm assembly 10. In other words, the moving center pivot arm assembly 10 is paced by the outermost drive tower 32 using a span motor 38 variably controlled in an on-and-off manner by a speed timer 4 (FIGS. 2A, 2B and 4A).

Typically, the speed timer 4 may be set to control the span motor 38 of the outermost drive assembly 34 of the outermost drive tower 32 to a running status using the base percent setting 3, 5, (FIGS. 2A and 2B) configured as a percentage of a one-minute cycle. Referring to the table of values in FIG. 7, the base percent setting 5 (FIG. 2B) may provide a percentage rate speed of 10% (FIGS. 7 and 9, column 1) that is achieved by adjusting the relative proportion of on-time 61 and off-time 62 of the span motor 38 to 6 seconds on (column 3) and 54 seconds off (column 4) for each one-minute cycle (column 5) of the speed timer 4. For a typical center pivot irrigation system 1, this example results in 8,168 on-and-off cycles per rotation (FIGS. 7 and 9, column 6).

In another example of the prior art, FIG. 2A illustrates a speed timer 4 set to a percentage rate speed of 50%. This results in the span motor 38 of the drive assembly 34 of outermost tower 32 cycling span motor 38 on for 50% of 60 seconds (i.e., for 30 seconds) and cycling off for the remainder of the one-minute cycle. Referring to the table of values in FIGS. 8 and 10, column 1, last row, the base percent setting 3 (FIG. 2A) of the speed timer 4 provides a percentage rate speed of 50% (FIGS. 8 and 10, column 1, last row) that is achieved by adjusting the relative proportion of on-time 61 and off-time 62 of the span motor 38, respectfully, to 30 seconds on (column 3) and 30 seconds off (column 4) for each one-minute cycle (column 5) of the speed timer 4.

When the speed timer 4 cycles the span motor 38 on (for any base percent setting 3, 5) the span motor 38 operates at a fixed speed, typically 1,760 RPM. The speed timer 4 simply controls the average speed by adjusting the relative proportion of on-time 61 and off-time 62 for a given base percent setting 3, 5. For example, assuming a one-minute speed timer, a 20% base percent setting would power the outermost drive motor for an on-time of 12 seconds, followed by an off-time of 48 seconds per one-minute cycle. This conventional method of adjusting the pivot arm's speed results in a single on-and-off cycle for each successive one-minute time period.

This once-per-minute frequency of the on-and-off cycle occurs without regard to the resulting moving center pivot arm's average speed. The only exception is a 100% speed timer percent rate speed setting, wherein the last drive motor is on continuously with no off-time. At speed timer speeds of less than 100%, the outermost drive motor will always total 1,440 on-and-off cycles in any given 24-hour period (1,440 minutes in 24 hours), regardless of the average speed over time of the pivot arm.

For a typical, quarter mile long center pivot system, irrigating about 120 acres, the circumference of the outermost wheel track is about 7,900 feet. At very slow speeds, e.g., a 5% speed timer setting (wherein the outermost drive motor is powered on for three seconds out of every minute), the number of on-and-off cycles of the outermost drive motor necessary to complete a single rotation (7,900 foot circumference of the outermost wheel track) of the moving center pivot arm of a typical quarter mile long center pivot is between 8,000 and 27,000, depending on motor speeds, gearbox ratios, and wheel and tire sizes. At higher speed timer settings, e.g., 40% speed timer setting (the outermost drive motor is powered on for 24 seconds out of every minute), the number of on-and-off cycles is between 1,000 and 3,500, again, depending on motor speeds, gearbox ratios, and wheel and tire sizes. At a 5% speed timer setting, the outermost tower structure moves about 0.3-1.0 feet per minute depending on motor speeds, gearbox ratios, and wheel and tire sizes. As cited above, this legacy method of controlling the speed of the moving center pivot arm can require as many as 27,000 on-and-off cycles of the outermost drive motor for a single rotation of the pivot arm assembly.

Commonly, irrigation rates of movement for a quarter-mile long center pivot result in speed timer settings between 5% and 50%. The high frequency of on-and-off cycles required with a fixed cycle time needlessly exacerbates the wear and tear on drive components and increases irrigation downtime, especially at slower speed timer settings that are typical for delivery of water applications meeting the needs of growing crops.

Center pivot manufacturers provide optional speed timer devices, (e.g., 30-second speed timers or two-minute speed timers), but the one-minute speed timer used to determine the above on-and-off cycle times is conventional and typical and has been the standard throughout the industry since the inception of the drive center pivot in 1968. The industry-standard of a one-minute speed timer may have resulted from the perception that smaller increments of movement more closely mimic a continuous movement system, considered optimum for uniform and precise water application. The objective of near-continuous movement is achieved at the cost of a high frequency of on-and-off cycles on the drive motors that results in excessive wear and tear on drive components and increased irrigation downtime.

Solution to the Problem

In response to the shortcomings of the prior art, the present invention lengthens the period of each on-and-off cycle to provide for a longer modified on-time and a proportionately longer modified off-time for each on-and-off cycle. The combination of both longer on-time and off-time for each on-and-off cycle significantly reduces the frequency of on-and-off cycles for a given average speed of the pivot arm compared to conventional speed control methods currently used.

Reducing the number of on-and-off cycles significantly reduces the wear and tear on outermost drive tower components. The present invention also reduces wear and tear on the drive components of the adjacent intermediate drive tower structures, although to a lesser degree for each intermediate drive tower structure from outermost to innermost.

An additional benefit of the present invention is to reduce center pivot system downtime that may be caused by drive component failures.

Preferably, the present invention increases the duration (or period) of the on-and-off cycle by an amount that is an inverse function of the average speed of the pivot arm. For example, the duration of the on-and-off cycle may be varied inversely to the average speed of the pivot arm. Varying the on-and-off cycle period (e.g., from one-minute to a longer period such as five-minutes) substantially reduces the number of on-and-off cycles for a given average speed.

SUMMARY OF THE INVENTION

The present invention provides a system for controlling the operation of a moving irrigation system that lengthens the period of the on-and-off cycle specified by the speed timer to drive the pivot arm assembly. This reduces the frequency of the on-and-off cycles and thereby reduces wear and tear on the drive components. To modify the cycle period, a processor determines a modified on-time and a modified off-time having the same ratio of on-time to off-time as the speed timer to maintain the same average speed for the pivot arm assembly. The processor then controls operation of the pivot arm assembly to move in an on-and-off manner using the modified on-time and modified off-time.

In one embodiment of the present invention, the modified on-time is predetermined constant value (e.g., 30 seconds) and the modified off-time is varied to achieve a desired average speed for the pivot arm. For example, the processor may modify the on-time to 30 seconds and adjust the off-time to 270 seconds to achieve the same average speed for the irrigation system as would be achieved by a conventional one-minute speed timer set to 10% (i.e., 6 seconds on-time duration and 54 seconds off-time per cycle).

In a second embodiment of the present invention, both the modified and on-time and modified off-time vary to achieve a desired average speed for the pivot arm. This can be done using a table of values for the modified and on-time and modified off-time that are stored in memory for the processor based on the speed time setting. For example, adjusting the on-time duration to 16.7 seconds and adjusting the off-time duration to 150 seconds is exactly the same average speed as setting a conventional speed timer to 10% (i.e., 6 seconds on and 54 seconds off per cycle).

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which:

FIG. 7 is a table of values for percentage rate speeds of 5% to 27% comparing the number of on-and-off cycles of the conventional speed timer (columns 1-6) to the number of modified on-and-off cycles for the same average speed using the first embodiment of the present invention (columns 7-12), wherein the modified on-time is predetermined constant value, and modified off-time is varied to achieve a desired average speed.

FIG. 8 is a table of values for percentage rate speeds of 28% to 50% comparing the number of on-and-off cycles of the conventional speed timer (columns 1-6) to the number of modified on-and-off cycles for the same average speed using the first embodiment of the present invention (columns 7-12), wherein the modified on-time is a predetermined constant value and the modified off-time is varied to achieve a desired average speed.

FIG. 9 is a table of values for percentage rate speeds of 5% to 27% comparing the number of on-and-off cycles of a conventional speed timer to the number of modified on-and-off cycles for the same average speed using the second embodiment of the present invention wherein both the modified on-time and modified off-time are varied to achieve a desired average speed.

FIG. 10 is a table of values for percentage rate speeds of 28% to 50% comparing the number of on-and-off cycles of a conventional speed timer to the number of modified on-and-off cycles for the same average speed using the second embodiment of the present invention wherein both the modified on-time and modified off-time are varied to achieve a desired average speed.

DETAILED DESCRIPTION OF THE INVENTION

Figure 4:
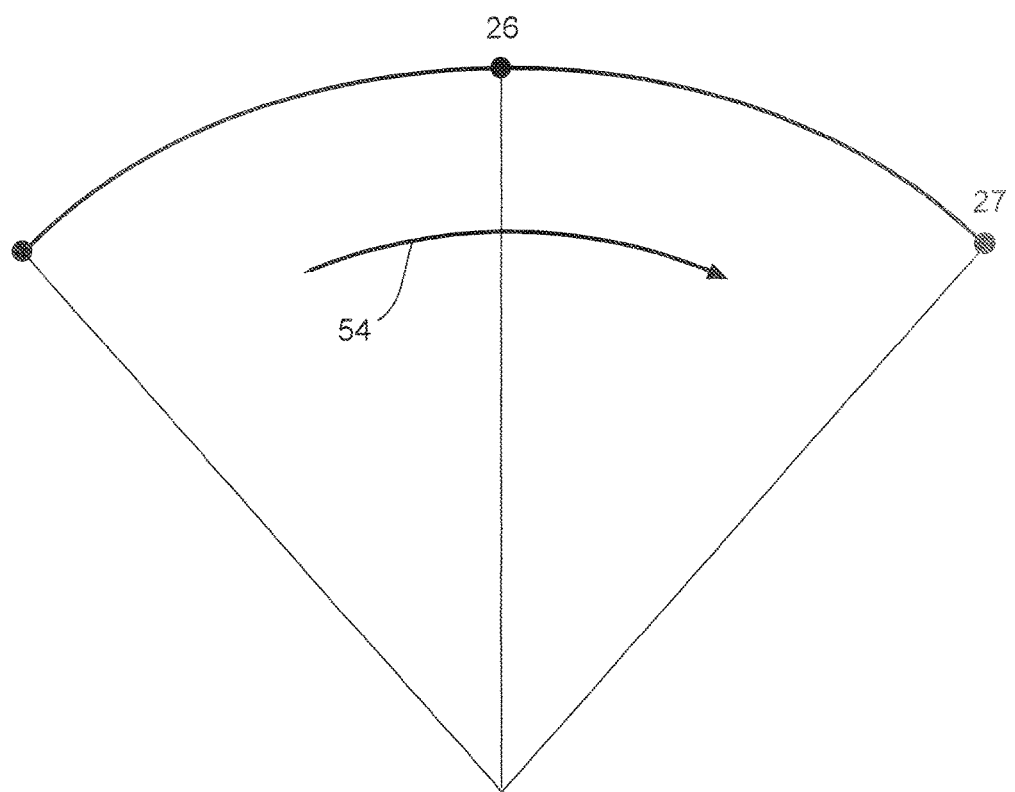
FIG. 4 is a diagram similar to FIG. 3 showing the movement of a center pivot arm assembly over two modified on-and-off cycles using present invention.
Figure 4A:
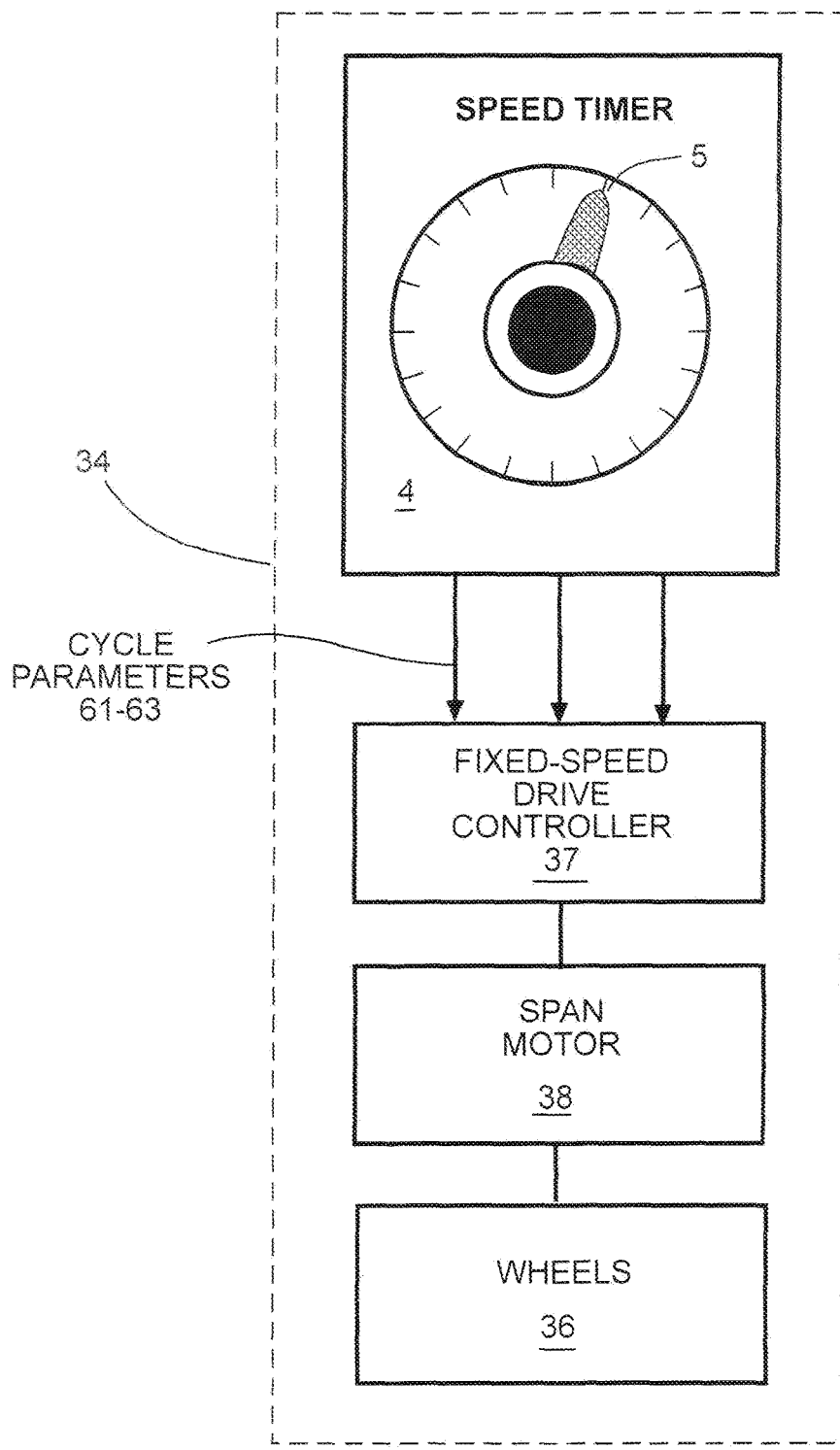
FIG. 4A is an illustration of a drive controller 34 of the prior art.
Figure 4B:
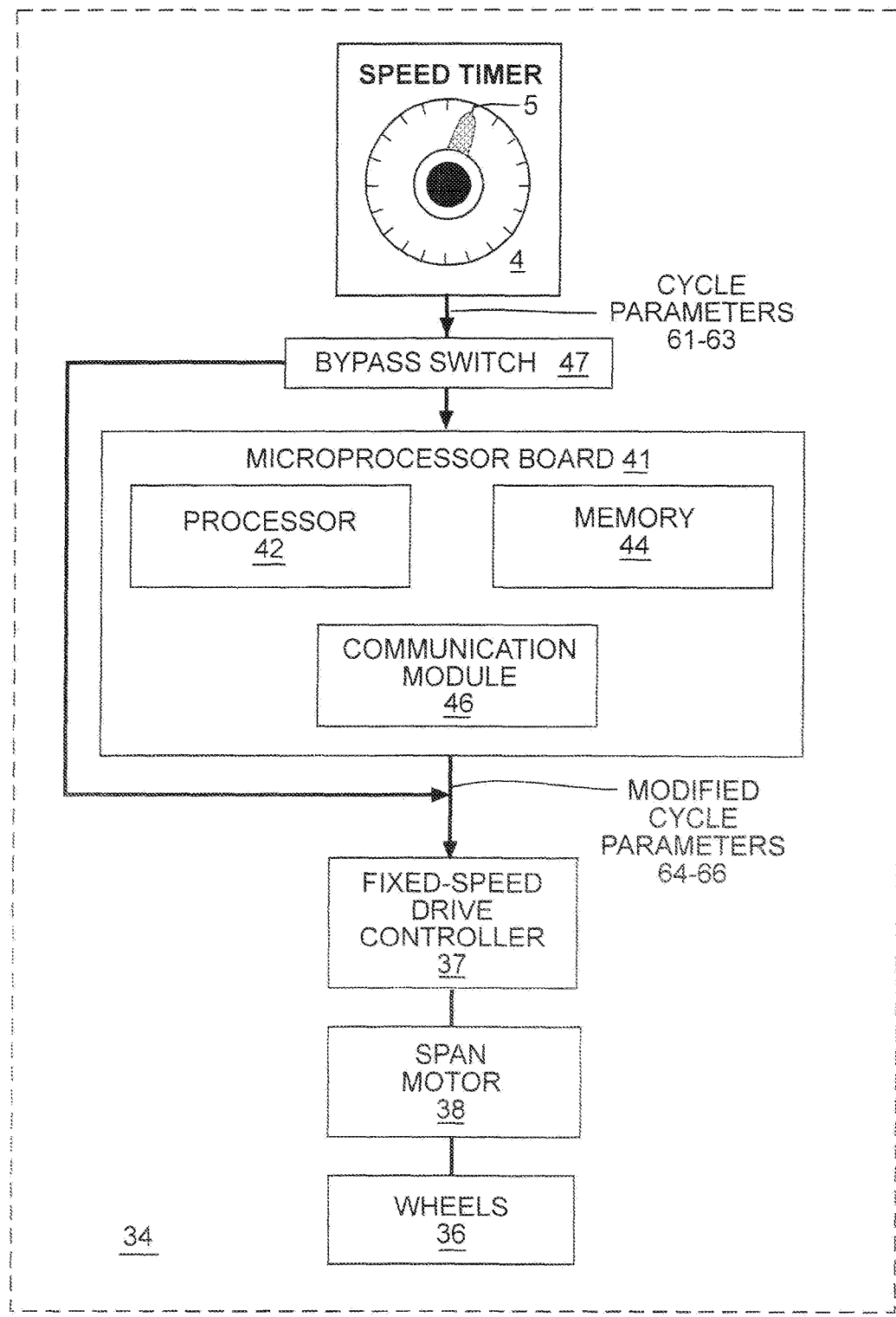
FIG. 4B is an illustration of the drive assembly of the present invention incorporating a processor 42 between the speed timer 4 and the drive controller 37.

FIG. 4B illustrates an embodiment of the present invention using a processor 42 to monitor the cycle parameters (i.e., on-time 61, off-time 62 and cycle period 63) output by the speed timer 4 to determine the base percent setting 5 (e.g., a percentage rate speed of 10% in FIGS. 7, 8, 9 and 10, column 1). In turn, processor 42 determines corresponding modified cycle parameters (i.e., modified on-time 64, modified off-time 65, and modified cycle period 66) (columns 8, 9, and 10 of FIGS. 7, 8, 9 and 10) for the drive controller 37. For example, the processor 42 can be a conventional microprocessor on a microprocessor board 41 that is also equipped with memory 44 and a communications module 46 under the control of the processor 42.

Figure 1:
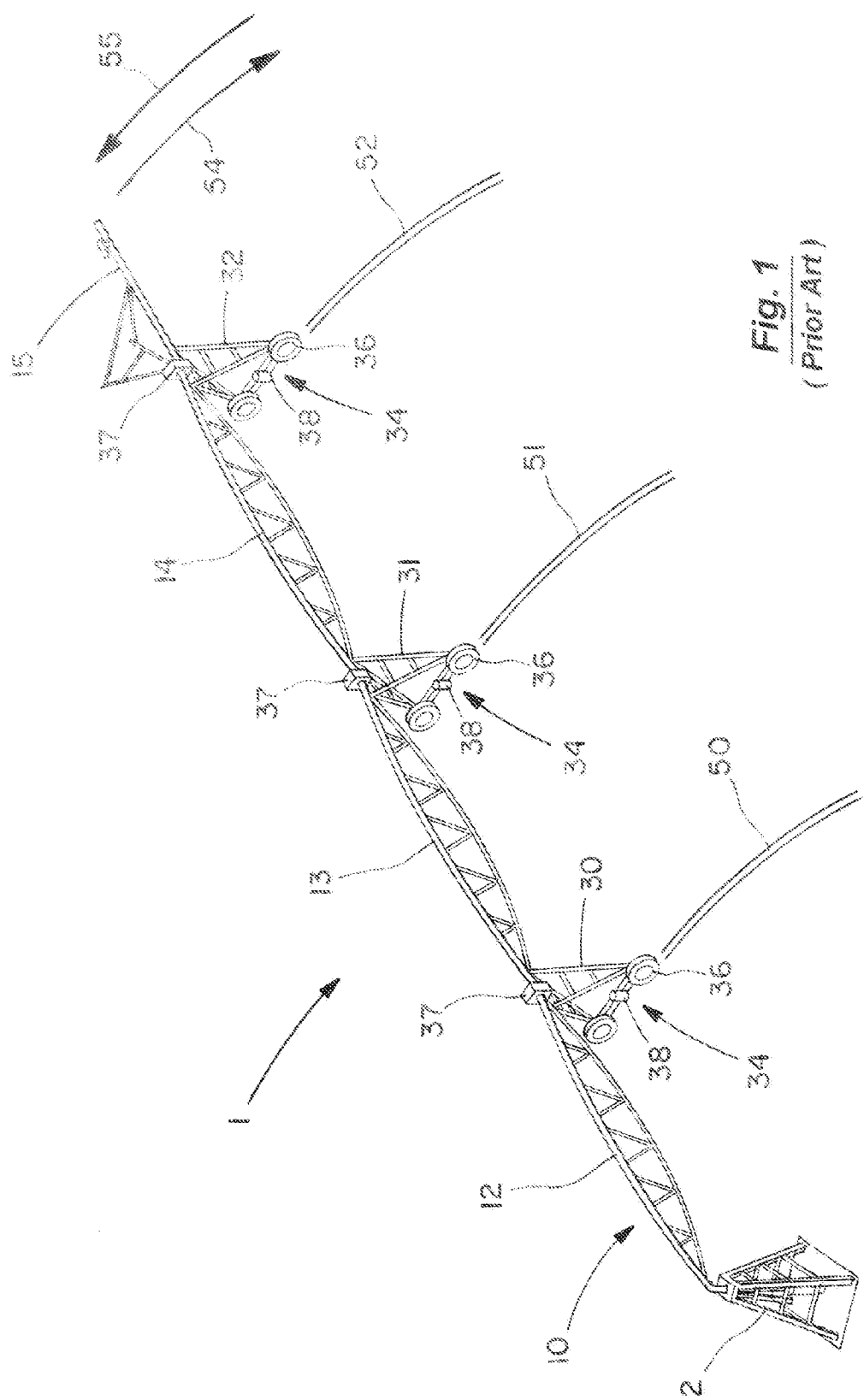
FIG. 1 illustrates a conventional center pivot arm assembly with intermediate and outermost drive tower structures with drive motors and wheels, and span movement in either a forward or a reverse movement direction.
Figure 2B:
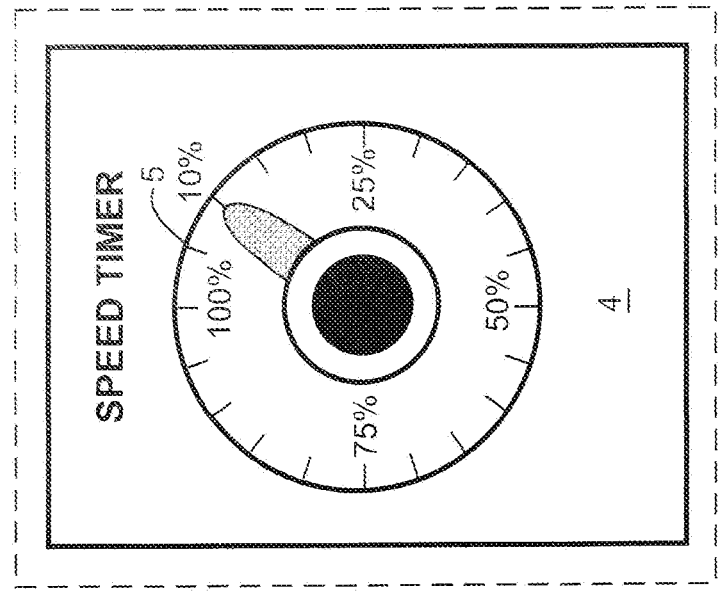
FIG. 2B illustrates a speed timer dial with a graduated scale of 0% to 100% with the dial set to 10% as an example.
Figure 2A:
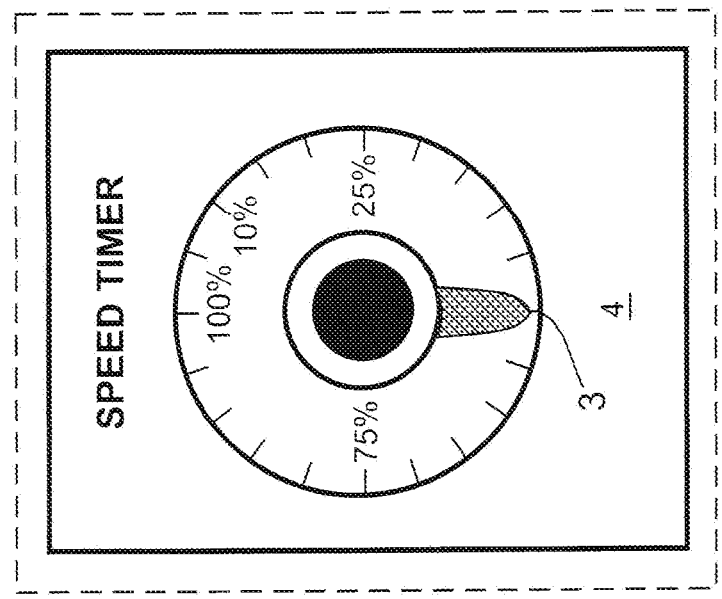
FIG. 2A illustrates a speed timer dial with a graduated scale of 0% to 100% with the dial set to 50% as an example.

The modified cycle parameters (i.e., modified on-time 64, modified off-time 65, and modified cycle period 66) are then used by the processor 42 to control the on-and-off cycle of the span motor 38 driving the wheels 36 of the drive assembly 34, so as to provide a relatively constant average speed of the pivot arm assembly 10 (FIG. 1) for a given base percent setting 5. The desired average speed to the pivot arm assembly 10 can be maintained while creating a modifying cycle period that is longer than the cycle period specified by the speed timer, by creating a modified on-time 64 and a modified off-time 65 that maintain the same ratio of on-time 61 to off-time 62 as the speed timer 4. This longer, modified cycle period 66 has the benefit of reducing the frequency of on-and-off cycles for the pivot arm assembly 10 in comparison to a conventional one-minute cycle period.

Figure 3:
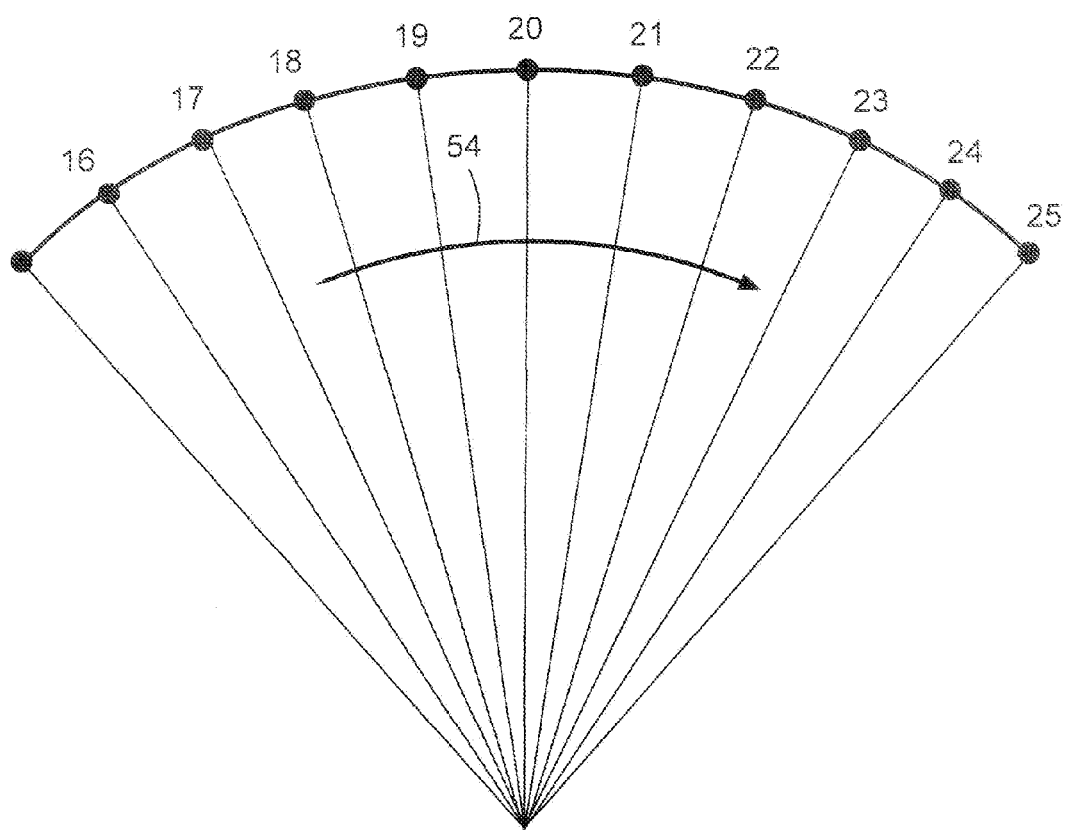
FIG. 3 is a diagram illustrating the movement of a conventional center pivot arm assembly over ten on-and-off cycles.
Figure 3A:
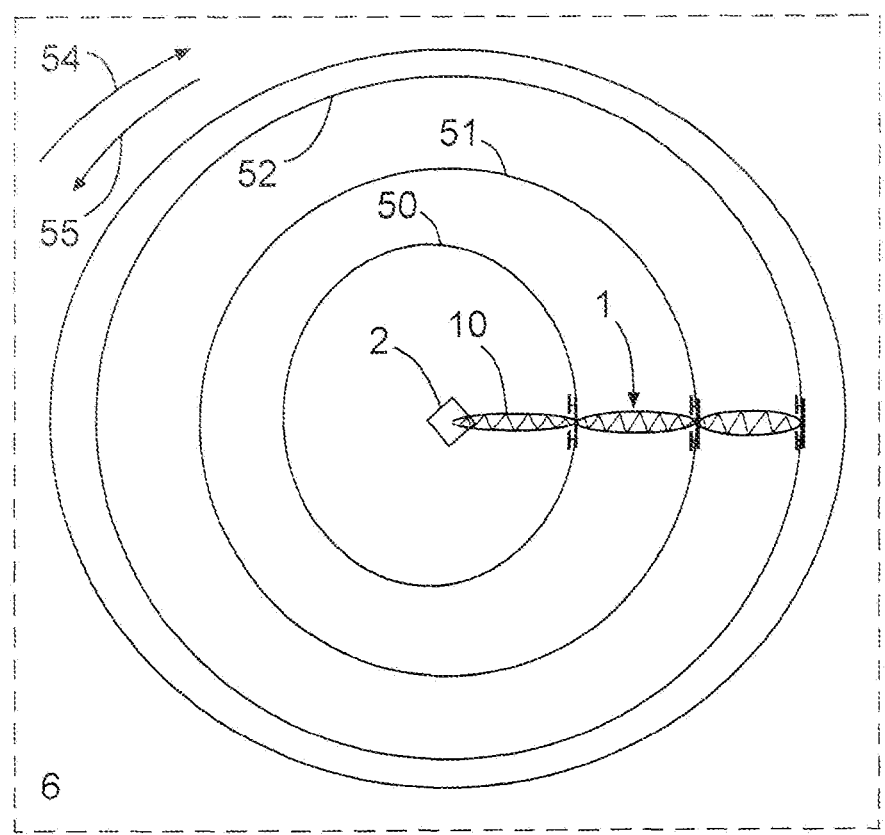
FIG. 3A is a diagram illustrating the movement of a center pivot arm assembly over a circular field.

FIGS. 3 and 4 illustrate an example of the present invention, in which ten conventional on-and-off cycles 16-25 over a predetermined period of time (e.g., 10 minutes) in FIG. 3 are reduced to two modified on-and-off cycles 26, 27 in FIG. 4 using the present invention. Compared to the on-and-off cycles 16-25 illustrated for the prior art in FIG. 3, this example of the present invention provides an 80% reduction in on-and-off cycles 16-25 for the same distance of travel and the same period of time.

FIGS. 7 and 8 show an embodiment of the present invention in which the modified on-time 64 (column 8) output by the processor 42 is fixed at a predetermined constant value (e.g., 30 seconds). But, the modified off-time 65 (column 9) is varied so as to provide the same average speed as set by the speed timer setting 3, 5 using the on-time 61 (column 3) and off-time 62 (column 4) detected by the processor 42. The modified on-time 64 may be set in memory 44 of the microprocessor board 41 (FIG. 4B). In turn, the modified off-time 65 may be calculated by the processor 42 using an algorithm that factors the off-time 62 by the speed timer 4 by the ratio of the modified on-time 64 to the on-time 61 set by the speed timer 4. This maintains the same average speed for the pivot arm as that set by the speed timer 4.

For example, with a conventional one-minute speed timer 4 set to a percentage rate speed of 10%, the on-time 61 is six seconds and the off-time 62 is 54 seconds. Over a period of five minutes, the on-and-off cycle for the prior art is repeated five times (once per minute). With the modified on-time 64 fixed at thirty second, the modified off-time 65 for this same speed timer setting is determined by the processor 42 (FIG. 4B) as follows:

modified off-time 65=off-time 62*(modified on-time 64/on-time 61)

Or, for the 10% speed timer setting: (30/6)*54=270 seconds. Over a five-minute period, the modified on-and-off cycle 66 for this embodiment of the present invention occurs just once (30 seconds+270 seconds=300 seconds, or 5 minutes). Thus, this embodiment of the present invention provides an 80% reduction in on-and-off cycles when compared to the typical prior art.

In another variation on this first embodiment, the processor 42 calculates the modified on-time 64 and modified off-time 65 by selecting a modified on-and-off cycle period 66 that is longer than the on-and-off cycle period 63 of the speed timer 4. The processor 42 then calculates the modified on-time 64 and modified off-time 65 by multiplying the on-time 61 and off-time 62 of the speed timer 4 by the ratio of the modified on-and-off cycle period 66 to the on-and-off cycle period 63 of the speed timer.

In a second embodiment of the present invention, the modified on-time 64 (FIGS. 9 and 10, column 8) is varied as determined by the processor 42. Simultaneously, the off-time 65 may also be varied. The modified on-time 64 and modified off-time 65 can be configured using table values (e.g., FIGS. 9 and 10, columns 8 and 9) to provide the same average speed as set by the speed timer. The modified on-time 64 and modified off-time 65 can be stored in a table in the memory 46 of the processor 42. For example, using the values set forth in the table in FIG. 9 for a speed timer setting of 10%, the processor 42 adjusts the modified on-time 64 to 16.7 seconds (column 8) and the modified off-time 65 to 150 seconds (column 9). This results in the same average speed as setting a conventional speed timer 4 to a base percent setting of 10% (i.e., 6 seconds on and 54 seconds off per one-minute cycle).

Staying with the example of speed timer setting of 10% and referring to FIG. 9 for the second embodiment of the present invention, after a period of five minutes, the outermost drive motor 38 has moved the corresponding outermost drive tower 32 for an on-time 64 of 16.7 seconds. This is the same proportion as an on-time 61 of six seconds in a one-minute on-and-off cycle. In other words, the outermost drive motor 38 has moved the corresponding drive tower structure 32 for 30 seconds out of each five minutes. Similarly, for the second embodiment of the present invention, the outermost drive motor 38 has moved the outermost drive tower 32 for 30 seconds for each five-minute period. But, for the prior art, the total number of on-and-off cycles is five. For the second embodiment of the present invention, the number of on-and-off cycles is 1.8 per five-minute period. Thus, the second embodiment of the present invention provide a 64% reduction of on-and-off cycles when compared to typical prior art for a speed timer setting of 10%.

Similarly, in another example of the second embodiment of the present invention, adjusting the modified on-time 64 to 20 seconds and adjusting the modified off-time 65 to 80 seconds results in the same speed as setting the conventional one-minute speed timer 4 to 20% (12 seconds on-time 61 duration and 48 seconds off-time 62 duration for each one-minute cycle). At typical percentage rate speeds (5% to 50%), the present invention provides two simple means of significantly reducing the frequency of on-and-off cycles as compared to the prior art convention using one-minute speed timers 4.

Figure 5:
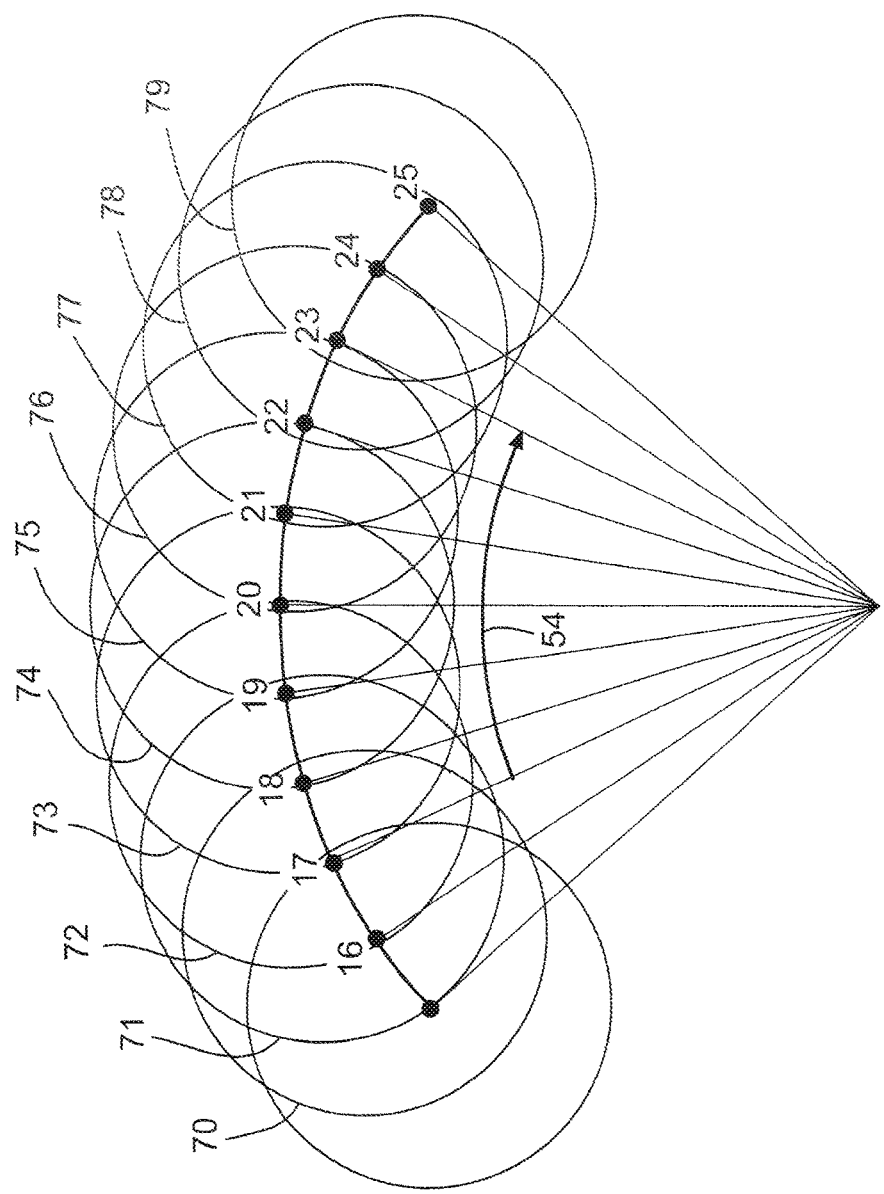
FIG. 5 illustrates the typical overlapping water spray patterns of an outermost spray nozzle as the drive tower structure is moved in ten conventional on-and-off cycles.

In either of these embodiments, there may be practical limitations to reducing the frequency of the on-and-off cycles based on design limitations of the pivot irrigation system 1. For example, the resulting effect on the overlapping water spray patterns under the center pivot arm assembly 10 of modifying the on-time 61 and off-time 62 may cause the overlapping spray patterns to be diminished to a point of significantly lessening the uniformity of the water application. Typical sprinkler nozzle devices provide water spray pattern diameters of about 20 to 60 feet under each of the plurality of spray nozzles distributing water along the center pivot moving arm assembly 10. Typically, such spray nozzles are spaced equally along the linear distance of the outermost span 14 with appropriate overlapping water spray patterns. Using an on-time 66 that provides between five to twelve feet of movement of a corresponding outermost drive tower 32 for each on-and-off cycle may be well within the range of accepted uniformity of typical overlapping irrigation water spray patterns. FIG. 5 illustrates the typical overlapping water spray patterns 70-79 of an outermost spray nozzle as the drive tower structure is moved in ten conventional on-and-off cycles 16-25.

Figure 6:
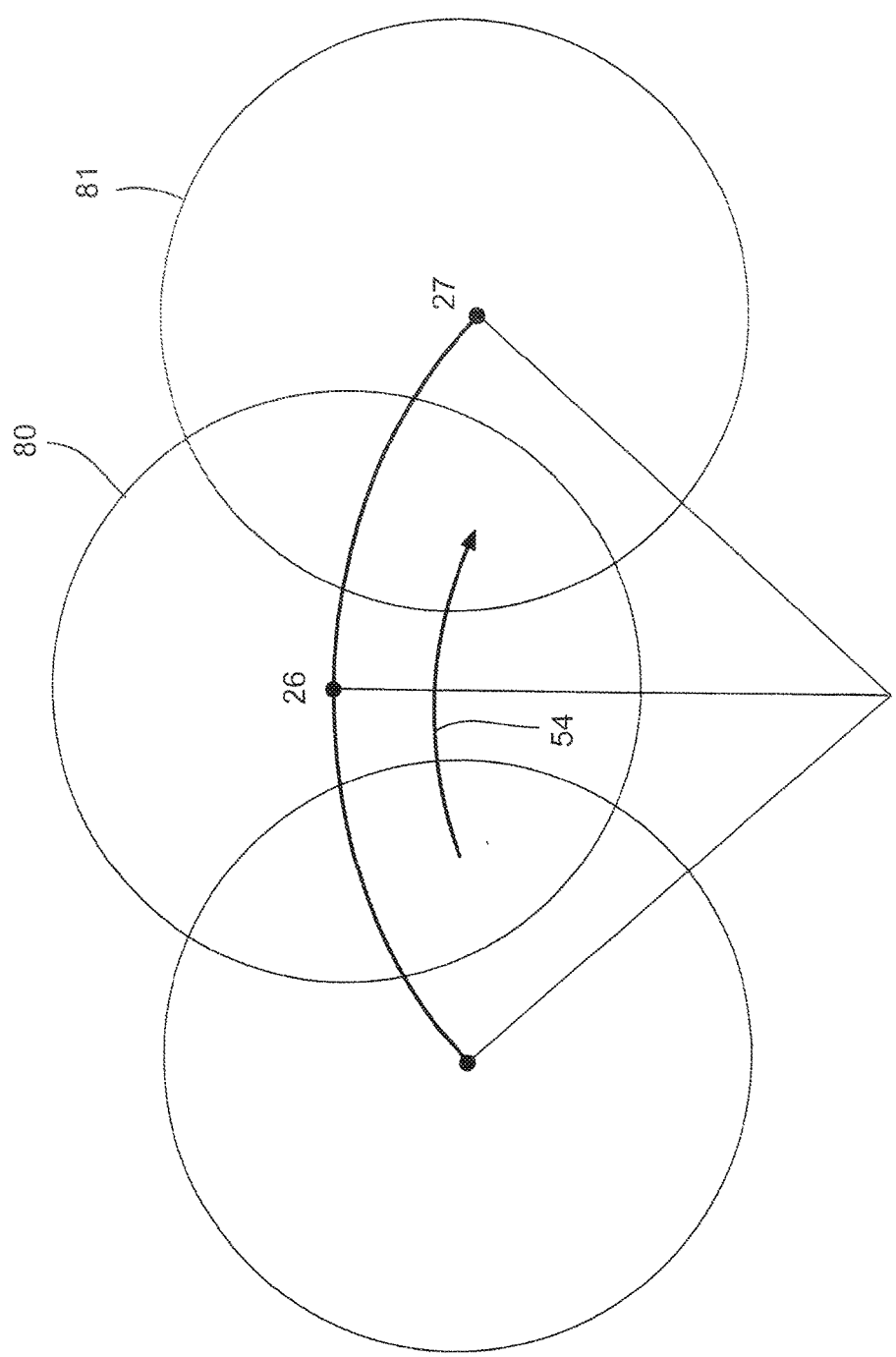
FIG. 6 illustrates the overlapping water spray patterns of an outermost spray nozzle as the drive tower structure is moved in two modified on-and-off cycles using the present invention.

For example, controlling an outermost drive tower structure 32 by: (1) fixing the on-time 64 to result in a speed of five to twelve feet per on-and-off cycle; and adjusting the overall speed over time by changing only the off-time of each on-and-off cycle may significantly reduce the frequency of the on-and-off cycle and may not significantly affect the uniformity of the overlapping water spray patterns. Simply adjusting the average speed by fixing the on-time 64 and modifying only the off-time 65 of each on-and-off cycle may significantly reduce the total number of on-and-off cycles per rotation (FIGS. 7 and 8, column 11) without significantly affecting the uniformity of the overlapping water spray patterns. In contrast to FIG. 5, FIG. 6 illustrates the overlapping water spray patterns 80-81 of the outermost spray nozzle as the drive tower structure is moved in two modified on-and-off cycles 26-27 using the present invention.

In a more extreme example, fixing the modified on-time 64 to result in an average speed of twenty to fifty feet per on-and-off cycle, and adjusting the average speed by changing only the modified off-time 65 of each on-and-off cycle, may significantly reduce the number of on-and-off cycles for a given rotation time. However, a longer modified on-time 64 may also negatively affect the uniformity of the overlapping water spray patterns. In other words, there are recognized practical design limitations to the application of the present invention to maintain a desired degree of uniformity in the resulting water distribution patterns.

With either embodiment of the present invention, a processor 42 can be used in conjunction with algorithms and tabled values stored in memory 44 to calculate a reduced frequency (increased duration) of the on-and-off cycle that controls the average speed of the pivot arm 10. Reducing the frequency of on-and-off cycles benefits the irrigation process by decreasing wear and tear on driveline components of drive towers 30, 31, 32, thereby reducing downtime. Reducing downtime significantly improves the overall irrigation process for center pivot irrigation systems 1.

As previously discussed, the present invention can be used to more optimally control the pivot arm's movement over the ground by variably increasing the either or both the on-time and the off-time of each on-and-off cycle. It should be noted that the benefit of these increases is generally inversely proportional to the speed set by the speed timer 4. The slower the speed timer setting, the more the modified on-time 64 and modified off-time 65 may be increased, and the greater the resulting benefit of the present invention in terms of reducing the frequency of on-and-off cycles. At the other end of the spectrum of speed setting (i.e., a speed timer setting of 100%), lengthening the modified cycle period 66 in accordance with the present invention has no effect, because the drive motor is already running continuously at a speed timer setting of 100%. Consequently, the increase in the modified cycle period 66 can be made a function of the speed timer setting 3, 5. In particular, the increase in the modified cycle period 66 should be inversely related to the average speed of the pivot arm assembly as specified by the speed timer setting. The modifications to the on-time and off-time can be increased by large amounts at slower speed timer settings, and the modifications should drop to zero as the speed timer setting approaches 100%.

In practice, the processor 42 can be configured not to modify any on-time 61 specified by the speed timer 4 for base percent settings 3, 5 that is above predetermined maximum (e.g., 50%). Base percent speed timer-settings 3, 5 above such thresholds already result in on-times 61 that, if increased, could cause water spray patterns under the pivot arm assembly 10 to be negatively impacted.

In addition, the present invention may also include a switch 47 to selectively bypass the microprocessor board 41 (and processor 42) as shown in FIG. 4B. When the switch 47 is set to bypass the microprocessor board 41, the speed timer 4 effectively outputs the unmodified on-time 61 and off-time 62 to the drive controller 37, as illustrated in FIG. 4A. This essentially disables the step of modifying the output (i.e., on-time and off-time) of the speed timer 4, so the system would effectively operate in a prior-art mode controlled by the speed timer 4.

With reference to FIGS. 4B, 7, 8, 9 and 10, the modified cycle parameters 64-66 can be communicated to the drive controller 37 by a wired connection, or by using the communication module 46 of the microprocessor board 41. The drive controller 37 may, in turn, variably control the on-and-off cycle times of the span motor 38, to result in the same average speed of the pivot arm assembly 10 as conventionally achieved by the prior art with a conventional speed timer 4.

In general, aspects of the present invention are suitable for use on any center pivot irrigation system, but may also be utilized on other types of irrigation systems, such as linear and lateral move irrigation systems. The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

We claim:

1. A method for controlling the operation of an irrigation system having a moving pivot arm assembly and a speed timer controlling the pivot arm assembly to move in an on-and-off manner with a predetermined on-time and off-time during each on-and-off cycle period to maintain an average speed for the pivot arm assembly, said method comprising:
    determining a modified on-time and off-time to create a modified on-and-off cycle period that is longer than the on-and-off cycle period of the speed timer, wherein the modified on-time and off-time maintain the same ratio as a predetermined ratio of the on-time to off-time of the speed timer; and
    controlling operation of the pivot arm assembly to move in an on-and-off manner using the modified on-time and off-time to thereby maintain the average speed of the pivot arm assembly and reduce the frequency of the on-and-off cycle.

2. The method of claim 1 wherein the modified on-time and modified off-time are both varied to control the average speed of the pivot arm assembly.

3. The method of claim 1 wherein the modified on-time is a predetermined constant value and the modified off-time is varied to control the average speed of the pivot arm assembly.

4. The method of claim 1 wherein the modified on-time and off-time are determined by:
    selecting a desired modified on-and-off cycle period that is longer than the on-and-off cycle period of the speed timer; and
    calculating the modified on-time and off-time by multiplying the on-time and off-time of the speed timer by the ratio of the modified on-and-off cycle period to the on-and-off cycle period of the speed timer.

5. The method of claim 4 wherein the increase in the modified on-and-off cycle period is an inverse function of the average speed of the pivot arm assembly specified by the speed timer.

6. The method of claim 1 wherein the modified on-time and off-time are determined by:
    selecting a desired modified on-time that is longer than the on-time of the speed timer; and
    calculating the modified off-time by multiplying the off-time of the speed timer by the ratio of the modified on-time to the on-time of the speed timer.

7. The method of claim 1 wherein the modified on-time and off-time are not applied in controlling operation of the pivot arm assembly when the on-time specified by the speed timer exceeds a predetermined threshold.

8. An irrigation system comprising:
    a moving pivot arm assembly;
    a speed timer outputting an on-time and an off-time for each on-and-off cycle period for controlling a pivot arm assembly to move in an on-and-off manner; and
    a processor monitoring the on-time and off-time output by the speed timer and calculates a modified on-time and modified off-time to create a modified on-and-off cycle period that is longer than the on-and-off cycle period of the speed timer, wherein the modified on-time and modified off-time maintain the same ratio as a predetermined ratio of the on-time to off-time of the speed timer; said processor controlling operation of the pivot arm assembly to move in an on-and-off manner using the modified on-time and modified off-time to thereby maintain the average speed of the pivot arm assembly and reduce the frequency of the on-and-off cycle.

9. The irrigation system of claim 8 wherein the processor calculates the modified on-time and off-time by steps comprising:
    selecting a desired modified on-and-off cycle period that is longer than the on-and-off cycle period of the speed timer; and
    calculating the modified on-time and off-time by multiplying the on-time and off-time of the speed timer by the ratio of the modified on-and-off cycle period to the on-and-off cycle period of the speed timer.

10. The irrigation system of claim 8 wherein processor calculates the modified on-time and off-time by steps comprising:
    selecting a desired modified on-time that is longer than the on-time of the speed timer; and
    calculating the modified off-time by multiplying the off-time of the speed timer by the ratio of the modified on-time to the on-time of the speed timer.

11. The irrigation system of claim 8 wherein the processor modifies the on-time of the speed timer to create a modified on-time having a predetermined constant value, and calculates the modified off-time to maintain the same ratio as a predetermined ratio of the on-time to off-time of the speed timer to thereby control the average speed of the pivot arm assembly.

12. The irrigation system of claim 8 wherein the processor varies both the modified on-time and modified off-time to control the average speed of the pivot arm assembly.

13. The irrigation system of claim 8 further comprising a switch selectively bypassing the step of calculating the modified on-time and off-time provided by the speed timer, so that the pivot arm assembly operates using the on-time and off-time output by the speed timer.

* * * * *